F. J. TROLL.
LOAD INDICATOR FOR VEHICLES.
APPLICATION FILED OCT. 20, 1916.
1,329,684. Patented Feb. 3, 1920.
2 SHEETS—SHEET 1.
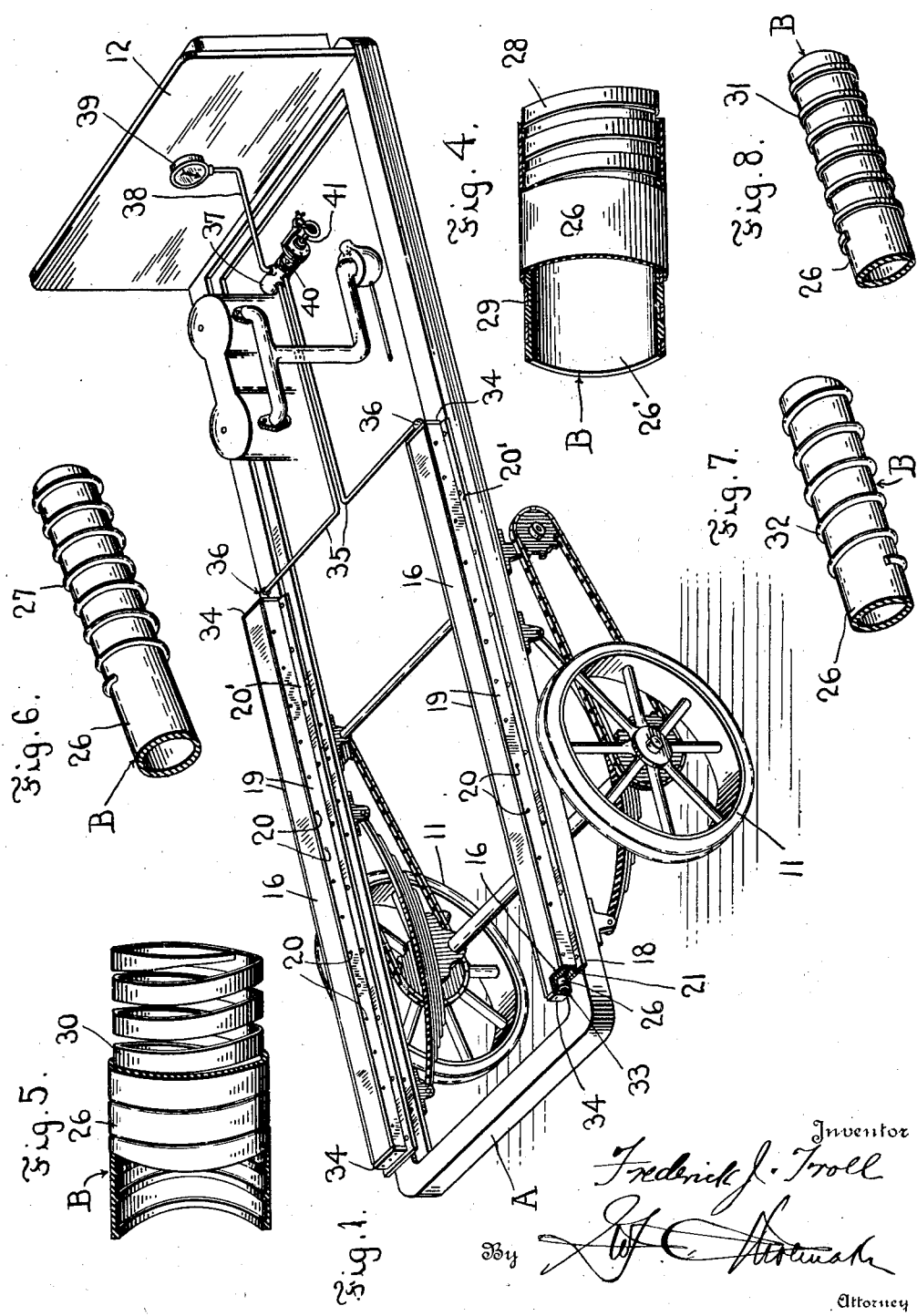

F. J. TROLL.
LOAD INDICATOR FOR VEHICLES.
APPLICATION FILED OCT. 20, 1916.
1,329,684.
Patented Feb. 3, 1920.
2 SHEETS—SHEET 2.
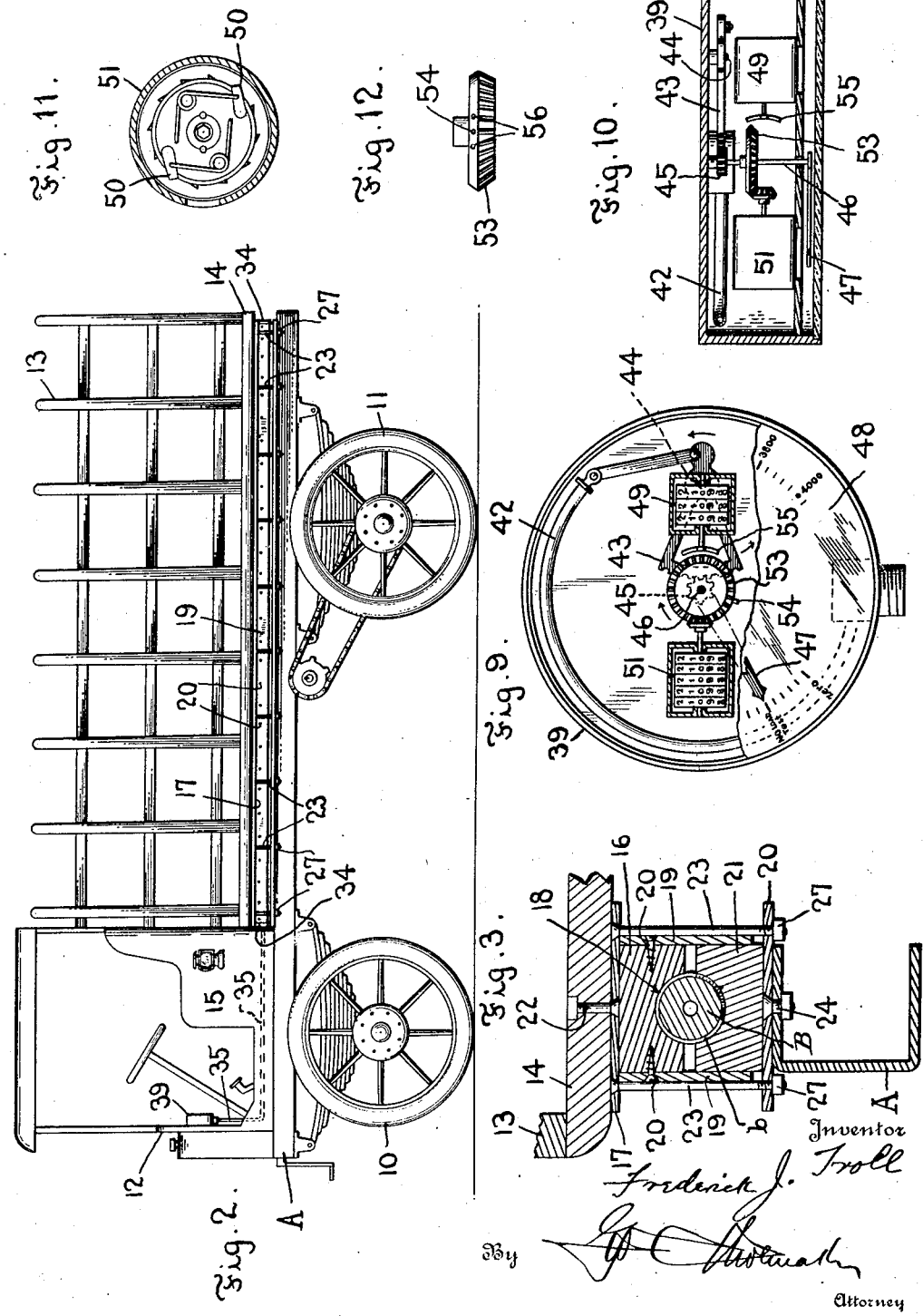

UNITED STATES PATENT OFFICE.

FREDERICK J. TROLL, OF BALTIMORE, MARYLAND, ASSIGNOR TO THE LOADOMETER COMPANY, OF BALTIMORE, MARYLAND, A CORPORATION OF DELAWARE.

LOAD-INDICATOR FOR VEHICLES.

1,329,684.   Specification of Letters Patent.   Patented Feb. 3, 1920.

Application filed October 20, 1916. Serial No. 126,723.

*To all whom it may concern:*

Be it known that I, FREDERICK J. TROLL, a citizen of the United States, residing at 2210 Mt. Holly St., Walbrook, Baltimore, and State of Maryland, have invented certain new and useful Improvements in Load-Indicators for Vehicles, of which the following is a specification.

This invention relates to load indicators for motor trucks or other vehicles, and may be termed a loadometer.

Motor trucks are sometimes equipped with a sign disposed at some convenient point on the vehicle to indicate the pounds capacity thereof. Warnings are also sometimes located on the vehicle to the effect that it should not be loaded to an extent beyond its rated carrying capacity, say for instance, 3,000 pounds. The reason for such notices and warnings is that overloads place the truck under unnecessary strain and impair the life of the truck. A cautious driver, in some instances, in his efforts to exercise extreme care may underload the truck, thereby reducing the operative efficiency by increasing the unit cost per pound of the materials handled. Careless drivers are likely to overload the truck, thereby increasing the repair cost, tire expense, etc., with the result that from the manufacturer's viewpoint, the reputation of the truck is affected to the disadvantage of the manufacturer.

It is therefore one object of my invention to provide a means particularly adapted to motor trucks to indicate underloads and overloads in units of 200 pounds more or less so that the rated capacity of the truck will not be abused or the operating efficiency reduced because of failure to load the truck to its rated capacity.

Another object resides in the provision of an appliance readily applicable to a motor vehicle or other truck, embodying among other characteristics, means whereby the total pounds handled may be indicated and when the weight capacity of the vehicle has been reached, indication thereof may be made as may also an indication of the number of times the vehicle has been overloaded.

Another object resides in the provision of an upper load carrying member and a load member between which is arranged a fluid containing, operating, compressible, load supporting member adapted to operate a load indicating member, and constructed to support the load independently of the presence of fluid therein.

With the above and other objects in view, the present invention consists in the combination and arrangement of parts hereinafter more fully described, illustrated in the accompanying drawings, and particularly pointed out in the appended claims, it being understood that changes may be made in the form, size, proportion and minor details without departing from the spirit or sacrificing any of the advantages of the invention.

In the drawings:—

Figure 1 is a perspective view of the invention, illustrating a portion of a vehicle showing my invention applied thereto.

Fig. 2 is a side elevation of the invention.

Fig. 3 is a fragmentary transverse sectional view through one side of the vehicle illustrating a portion of my invention in section.

Figs. 4, 5, 6, 7 and 8 are detail fragmentary views in perspective, of modified forms of the indicator operating member.

Fig. 9 is a front elevation of the gage with a part of the dial broken away.

Fig. 10 is a horizontal sectional view through the gage.

Fig. 11 is a transverse sectional view through one of the registering mechanisms illustrating one means for preventing backward movement of the registering disks.

Fig. 12 is a detail view of the driving gear of the gage illustrating a means for adjustably positioning the trip arm.

Referring now more particularly to the accompanying drawings, the reference character A indicates the frame of the chassis of a motor or other truck supported upon front and rear wheels 10 and 11 and to which the dash 12 is secured. A body 13 has its bottom 14 mounted on the chassis A and the driver's seat is indicated at 15.

The characters 17 and 20' indicate upper and lower plates interposed between the body and chassis on opposite sides of the vehicle. The plates 17 may be secured to the under side of the body in any suitable manner, one means being in the form of bolts 22. The lower plates 20' may be secured to the chassis frame in any suitable manner, as for instance, by means of bolts 24. These plates extend preferably from the rear of the driver's seat to the rear end of the truck, but obviously, they may be arranged transversely of the truck or otherwise.

Upper and lower sills 16 and 21 are interposed between the plates 17 and 20'. These sills are preferably of the same length as said plates, but preferably narrower than the plates. A longitudinal recess 18 is formed in the under side of each upper sill 16 to coincide with a longitudinal recess 25 formed in the upper face of each lower sill 21.

A compressible member B is interposed between the upper and lower sills of each set, each compressible member being seated in the corresponding aforesaid recesses of the coöperating sills and maintaining the sets of sills normally spaced.

Pairs of plates 19 are secured by means of suitable fastenings 20 to the sides of each upper sill 16 and depend from the sills 16 into overlapping relation with the sides of the respective lower sills 21. These plates 19 and the aforesaid plates 17 and 20', coöperate to provide a suitable housing or casing to exclude dust, moisture and other foreign matter from lodging or gaining access between the sills and affecting the compressible members B or the operation thereof.

To maintain the upper and lower sills against lateral displacement with relation to the body or chassis or relative to one another, and particularly to insure uniform pressure on the compressible members B throughout their lengths and to adjust and take up irregularities or unevenness in the construction of the compressible members or sills, or both, or incident to contraction and expansion, due to climatic conditions, vibration, wear or other causes, I may provide suitable devices. One means for these purposes is disclosed wherein the sills 16 and 21 are arranged between bolts 23, whose headed upper ends are fitted in countersunk perforations adjacent opposite edges of the aforesaid plates 17 and whose lower threaded ends pass through alining apertures formed along opposite edges of the aforesaid lower plates 20', nuts 27 having working fit on the lower ends of said bolts 23 beneath the plates 20'. By adjusting these nuts 27 on the bolts 23, the plates 17 and 20' and consequently the sills are adjusted. Any number of bolts 23 may be employed for the purposes stated. It is, however, by reason of this arrangement of plates and bolts that I am enabled to take up irregularities or unevenness in the compressible members or sills, or both, at any point along the line of the compressible members and sills.

The compressible members B are adapted to contain a fluid and the form of the compressible members may be varied. The compressible member B, illustrated in Fig. 3, has its walls constructed of relatively thick yieldable material and is adapted to yield under the influence of weight placed on the vehicle body or in the event of jolting, incident to riding over uneven surfaces, whether or not it contains fluid. A spiral spring $b$ may coöperate with the walls of the compressible member in Fig. 3 or not, as may be preferred.

In one embodiment of compressible, operating members B, the same may be composed of relatively thin yieldable material 26 as distinguished from the relatively thick material of which the compressible member B in Fig. 3, is composed. In the structure shown in Fig. 4, however, the yieldable element 26 of the compressible member B, incloses a spiral spring mounted on a hollow yieldable element 26'. In this particular embodiment of the invention, the spring 28 is of band or flat material and preferably countersunk in the inner yieldable element 26'. If preferred, the flat, band, spirally arranged springs may be disposed interiorly only of the yieldable element 26, without the employment of the yieldable element 26' of Fig. 4, as indicated at 30 in Fig. 5, in which latter embodiment of the invention, the spring is preferably countersunk in the rubber or other yieldable material; or, as shown in Fig. 8, the form of spring shown in Figs. 4 and 5 may be arranged exteriorly of the rubber element 26 and not countersunk therein, as shown at 31 in Fig. 8. In Fig. 7 there is shown a form of compressible member B wherein the yieldable element 26 is wound with an exterior spring element 32 of a substantially half oval-shape in cross section. As shown in Fig. 6, the compressible member has its yieldable element wound exteriorly with a stiff spring which is preferably round in formation, as indicated at 27'. If desired, it is obvious that this particular type of spring element 27' might be arranged interiorly of the rubber element 26, after the fashion of the interior springs hereinbefore described and irrespectively of whether the same be countersunk in the yieldable material.

Caps, plugs or other suitable elements 33 may be employed to effectively close the outer ends of the compressible members 26 in order to prevent escape of fluid at the outer ends of the latter. The fluid may be air, liquid, or other fluids, and in any event, of such nature as not to have an injurious effect on the compressible members as would tend to deteriorate or impair the life thereof.

It will thus be understood that there is interposed between the chassis A and the bottom 14 of the truck body, certain elements which, by virtue of their construction and arrangement, serve for one purpose, to absorb shocks between the chassis and the truck body in the event of the vehicle striking obstructions or running over uneven road surfaces, performing this function whether or not the compressible member contains fluid, because of the peculiar construction of the walls of the compressible members.

The cushioning or shock absorbing structure interposed, as described, however, has for another purpose the performance of another function, that is, to operate through other instrumentalities associated therewith to actuate an indicating mechanism. To this latter end, metallic, flexible or other tubes 35 may be connected by means of suitable couplings 36 to the inner ends of the compressible members B. These connections 36 are connected by means of suitable couplings with a fluid reservoir 37 located preferably near the front of the chassis.

The reservoir 37, need not necessarily be employed, but when the appliance is equipped with this reservoir, the same has pipe or other connection 38 with a low pressure gage 39 of any suitable character mounted preferably on the dash 12 of the vehicle.

The fluid capacity of the reservoir 37 may be adjusted or varied by a piston 40 provided with a screw threaded stem 41, which extends through one end of the reservoir.

Thus, the indicating means is actuated by one or more fluid containing, operating compressible members interposed between the body or other load carrying member and the chassis or any other suitable lower member, the compressible members being compressible to varying degrees according to the loads placed on the body or other load carrying member and the same being also capable of supporting the body or the load carrying member under the same varying degrees of compression, incident to varying loads, in the absence of fluid therein. In other words, the compressible members are constructed so that without fluid therein they cushion and support the body to the same extent, and in the same way as in the presence of the fluid.

With the fluid in the compressible members B, the slightest compression of the same will effect operation of the gage 39. With fluid in the compressible members, compression of the latter causes the fluid therein and the fluid in the reservoir 37 and between the same and the compressible member and the gage, to operate the Bourdon tube 42 in the gage 39 which effects actuation of the segmental gear 43 on its pivot 44. This segmental gear 43 is in mesh with a pinion 45 on the indicator hand shaft 46 and when the segmental gear swings, it causes the shaft 46 to rotate, and consequently shifts the hand 47 over the dial face 48 of the gage 39 and thereby indicates on the dial face the total pounds or amount of load in units as the load is placed on the truck.

The dial of the gage gives the rated capacity, say for instance, 3,000 pounds, although it is preferably graduated to indicate a greater rate of pounds capacity, as shown. It also discloses a "zero" point and a "no load test point." The hand indicator 47 should always point to this "no load test point" when the truck is unloaded.

There is maintained at all times an initial pressure on the system, for should there be any leakage, the indicator hand would drop below the "no load test point" toward the "zero" point. Should there be an extra amount of pressure from some cause or other, the hand 47 would go above the "no load test point." The aforesaid adjustable reservoir 37 is provided for the purpose of adjusting the hand indicator so as to maintain the indicator hand pointing directly to the "no load test point" when the truck is unloaded. If the truck has been loaded to 3,000 pounds to be carried to a certain point and 1,000 pounds is removed from the truck, the indicator hand 47 will drop back to the 2,000 pound mark. If the truck is then sent to another place and takes on 600 pounds, the indicator hand 47 will indicate 2,600 pounds. The additional 600 pounds and all loads taken on would be registered on a registering means including rotatable disks 51 held against backward movement by ratchets 50. The registering mechanism is immaterial as regards structure so long as it performs the functions ascribed herein. Should the truck be overloaded above a predetermined amount, it would cause the hand indicator 47 to indicate the total pounds on the dial. This overloading would be registered on a suitable register including the aforesaid rotatable disks 51 held against backward movement by ratchets 50. One way in which the times the truck has been overloaded may be indicated is to provide the beveled gear 53 on the shaft 46 with a projection or other tripping element 54 which is so disposed that when the gear 53 has been rotated to such an extent as to cause the indicator hand 47 to pass the predetermined amount of overload, as shown on dial 48, the trip 54 will engage the star wheel 55 and actuate the registering disks 49, thereby indicating the number of times the truck has been overloaded.

If desired, the beveled gear 53 may have a plurality of screw threaded holes 56 on its periphery, so that the tripping element 54 may be disposed therein interchangeably so that the trip will engage said star wheel 55 at different times, according to the hole in which the trip 54 is placed, whereby the amount of overload to be reached and indicated may be adjusted. By means of the ratchets 52, the registering disks turn in one direction only under the action of registering the loads and cannot accidentally rotate backward.

The form or construction of the indicating means and the devices associated therewith for registering purposes are immaterial as far as this invention is concerned. The main object involved herein, resides in the particular or peculiar means for effecting operation of the indicating means and in the means to insure uniform pressure on the compressible members throughout their lengths and to adjust and take up irregularities or unevenness in the construction of the compressible members or sills, or both.

What I claim is:—

1. The combination of a chassis and a body, indicating means having as one element thereof, a compressible body supporting member interposed between the chassis and body, and means along opposite sides of the compressible body supporting member for adjustably maintaining an equal pressure on the compressible member throughout its length.

2. The combination with a vehicle chassis and a body, of a fluid pressure means interposed between the chassis and the body, means having operative connection with said fluid pressure means to indicate when the weight capacity of the vehicle has been reached, means operatively connected to the indicating means and operated by the fluid pressure means to indicate the total weight carried by the vehicle, means operatively connected to the indicating means and operated by the fluid pressure means to indicate the number of times the vehicle has been overloaded, and means along opposite sides of the compressible body supporting member for adjustably maintaining an equal pressure on the fluid pressure means.

3. The combination with a chassis and a vehicle body, of a load indicator comprising indicating means and an operatively compressible member interposed between the chassis and body and constructed to support the body on the chassis and to contain a fluid, and means along opposite sides of the compressible body supporting member for adjustably maintaining an equal pressure on the compressible member throughout its length.

4. The combination with a chassis and a vehicle body, of a load indicator comprising indicating means and an operatively compressible supporting member interposed between the chassis and the body and constructed to contain an incompressible liquid, said member having its walls formed of yieldable material including a coiled element and adapted to support the body in spaced relation to the chassis independently of the presence of liquid, and means along opposite sides of the compressible body supporting member for adjustably maintaining an equal pressure on the compressible member throughout its length.

5. The combination of a chassis and a body, upper and lower sills arranged between the chassis and body, compressible means arranged between the sills, upper and lower plates between which the sills are arranged, means connecting the upper plate to the body, means connecting the lower plate to the chassis, bolts connecting the upper and lower plates on opposite sides of the sills, and nuts having working fit on said bolts for adjustably maintaining an equal pressure on the compressible means.

6. The combination of a chassis and a body, upper and lower sills arranged between the chassis and body, a compressible body supporting member interposed between the sills, a plate arranged between the upper sill and the body, a plate arranged between the lower sill and the chassis, said plates projecting upon opposite sides of the sills, plates connected to the upper sill and overlapping the lower sill, bolts connecting said upper and lower plates and disposed adjacent the second mentioned plates, and nuts having working fit with said bolts so as to adjust and maintain an equal pressure on the compressible member.

7. The combination of a chassis and a body, upper and lower sills arranged between the chassis and body, an indicating means having as one element thereof a compressible body supporting member interposed between said sills, a plate arranged between the upper sill and the body, a plate arranged between the lower sill and the chassis, a plurality of bolts connecting said plates on opposite sides of the sills, and means operatively connected with the bolts to provide for and maintain an equal pressure on the compressible member.

In testimony whereof I affix my signature.

FREDERICK J. TROLL.